(12) United States Patent
Curd (10) Patent No.: US 8,252,390 B2
(45) Date of Patent: Aug. 28, 2012

(54) OPTICAL STRUCTURE TO REDUCE INTERNAL REFLECTIONS

(75) Inventor: Alistair P. Curd, High Wycombe (GB)

(73) Assignee: Sharp Kabushiki Kaisha, Osaka (JP)

( * ) Notice: Subject to any disclaimer, the term of this patent is extended or adjusted under 35 U.S.C. 154(b) by 551 days.

(21) Appl. No.: 12/470,939

(22) Filed: May 22, 2009

(65) Prior Publication Data

US 2010/0297365 A1    Nov. 25, 2010

(51) Int. Cl.
*G02B 1/11* (2006.01)
(52) U.S. Cl. .......................... 428/1.3; 349/137; 359/586
(58) Field of Classification Search .................. 428/1.3; 349/137; 359/586
See application file for complete search history.

(56) References Cited

U.S. PATENT DOCUMENTS

| | | | |
|---|---|---|---|
| 5,061,874 A | 10/1991 | Hecq et al. | |
| 6,151,089 A * | 11/2000 | Yang et al. | 349/113 |
| 6,207,263 B1 | 3/2001 | Takematsu et al. | |
| 6,266,108 B1 * | 7/2001 | Bao et al. | 349/63 |
| 6,738,109 B2 * | 5/2004 | Jeon | 349/43 |
| 7,167,221 B2 | 1/2007 | Yeh et al. | |
| 7,215,075 B2 | 5/2007 | Kurata | |
| 2001/0022636 A1 * | 9/2001 | Yang et al. | 349/65 |
| 2001/0040662 A1 * | 11/2001 | Cheng et al. | 349/141 |
| 2002/0097351 A1 * | 7/2002 | Lee et al. | 349/43 |
| 2003/0210364 A1 * | 11/2003 | Chen | 349/113 |
| 2004/0109305 A1 | 6/2004 | Chisholm et al. | |
| 2006/0001091 A1 * | 1/2006 | Kim | 257/347 |
| 2006/0197096 A1 | 9/2006 | Kerdiles et al. | |
| 2007/0170400 A1 * | 7/2007 | Chang et al. | 252/500 |

FOREIGN PATENT DOCUMENTS

| | | |
|---|---|---|
| JP | 07-272857 | 10/1995 |
| JP | 11-038400 | 2/1999 |
| JP | 11-149252 | 6/1999 |
| JP | 2007-248607 | 9/2007 |
| WO | 2004/044998 | 5/2004 |
| WO | WO2010-134620 A1 * | 11/2010 |

OTHER PUBLICATIONS

JPO Website Machine English Translation of JP2007-248607, Aisaka et al., Sep. 27, 2007.*
JPO Website Machine English Translation of JP2002-311206, Amihoshi Junji., Oct. 23, 2002.*
Alexey N. Krasnov; "High-Contrast organic light-emitting diodes on flexible substrates"; Applied Physics Letters, vol. 80, No. 20, May 2002, pp. 3853-3855.

(Continued)

*Primary Examiner* — Sophie Hon
(74) *Attorney, Agent, or Firm* — Renner, Otto, Boisselle & Sklar, LLP (57) ABSTRACT

A structure for reducing internal reflections in an optical system includes a stack of layers including a first layer having a first refractive index, a second layer having a second refractive index, a third layer having a third refractive index, a fourth layer having a fourth refractive index, and a fifth layer having a fifth refractive index. The second layer is arranged between the first layer and the third layer, and the fourth layer is arranged between the third layer and fifth layer. Further, the third refractive index is greater than the second and fourth refractive indexes, the second refractive index is greater than the first refractive index, and the fourth refractive index is greater than the fifth refractive index.

14 Claims, 4 Drawing Sheets

OTHER PUBLICATIONS

Press et al.: "Numerical Recipes in C"; The Art of Scientific Computing, Second Edition, 1992, pp. 408-412. (cited on p. 5, line 34 of the specification).

Smith, W.J.; "Modern Optical Engineering", third edition, 2000, pp. 205-207. (cited on p. 6, line 1 of the specification).

Vandersteegen et al.; "Employing a 2D Surface Grating to Improve Light Out Coupling of a Substrate Emitting Organic LED"; Proc. of SPIE vol. 6468.

International Search Report and Written Opinion for corresponding International Application No. PCT/JP2010/058694 dated Jul. 13, 2010.

* cited by examiner

Figure 1
(Conventional)

Figure 2
(Conventional)

Figure 3

Figure 4
(Conventional)

Figure 5
(Conventional)

Figure 6

Figure 7
(Conventional)

Figure 8

OPTICAL STRUCTURE TO REDUCE INTERNAL REFLECTIONS

TECHNICAL FIELD

The present invention relates generally to optical systems and, more particularly, to a display structure that uses destructive interference of light to cost-effectively reduce reflections at higher-refractive index layers within an optical system.

BACKGROUND OF THE INVENTION

Many optical systems contain layers of contrasting refractive index, n. This gives rise to reflections within the system, diverting incident light from its designed path, decreasing efficiency and increasing noise. More particularly, several systems contain a higher-refractive index medium surrounded by two lower-refractive index media. In some such systems the higher-index medium is thin enough so that interference between reflections at the two surfaces of the higher-index layer can take place, constructively or destructively, depending on the optical path difference.

Figure 1:
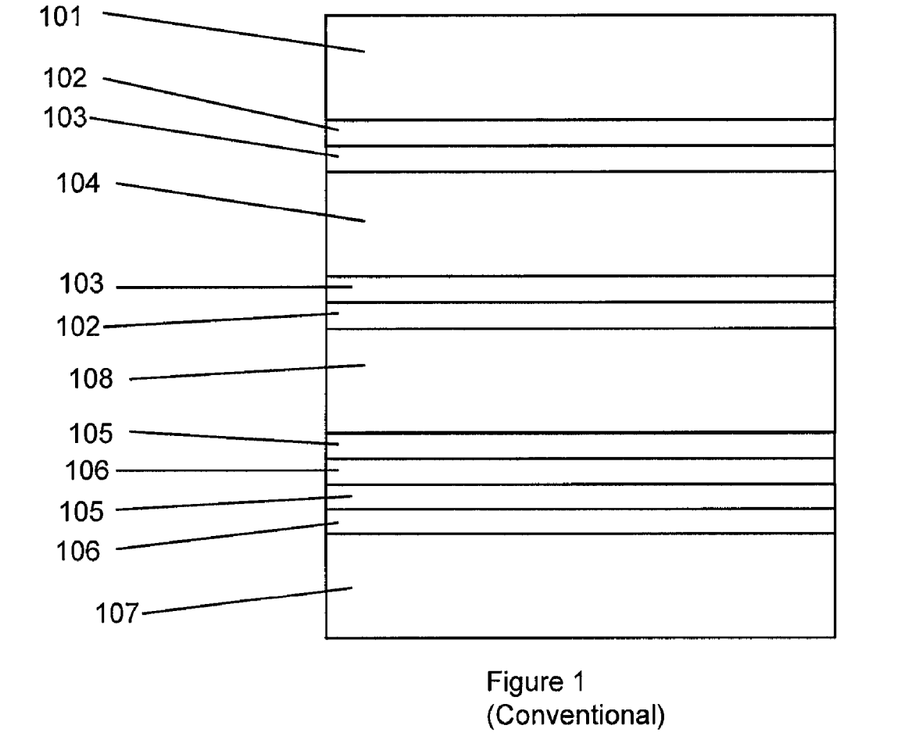
FIG. 1 illustrates an exemplary optical structure of an LCD system.

One such system illustrated in FIG. 1 is a liquid crystal display (LCD), where one indium-tin-oxide (ITO) electrode, 102, with n≈1.95, lies between layers of liquid crystal (LC), 104, with n≈1.53, and glass or color filter (CF), 101, with n≈1.53, and the other lies between LC, 104 and a planarizing resin, 108, with n≈1.59. There is also a thin layer of polyimide (PI), 103, with n≈1.70, between the LC and each ITO electrode. There are also layers of silicon nitride, 105, with n≈2.04, between layers of silica, 106, with n≈1.55 and/or the planarizing resin. The silica and silicon nitride layers are used as dielectric and for passivation in and around the thin-film transistor (TFT) system. Glass, 107, supports the structure. This is one typical structure in use in the industry.

Reflection of ambient light at a display device undesirably reduces the contrast of the image seen by a viewer. Anti-reflection coatings (ARCs) are used on the front surface of displays, which can reduce its reflectivity to less than 1%. However, reflections arise within the device, particularly at the ITO electrodes and silicon nitride layers, which also contribute to the degradation of the image in a brightly lit room. ARCs for the outer surfaces of optical systems have been studied in detail. One is described, for example, in U.S. Pat. No. 6,207,263.

Concerning interfaces within an optical system, that which has received most attention is a single interface, between a lower-refractive index medium and a higher-refractive index medium.

U.S. Pat. No. 5,061,874 describes a layer introduced between two media, together with a roughening of the interfaces, to reduce specular reflection.

Within the field of LCDs, several specific situations have been investigated, with a view to reducing reflections. Reducing reflections at a glass-semiconductor interface is the subject of US Patent Application No. 2006/0197096A. A structure which uses destructive interference of light to make a 'black matrix' effective as an absorber is claimed in U.S. Pat. No. 7,167,221. US Patent Application No. 2004/0109305A describes ARCs used on the elements of an LCD backlight which are in contact with air.

WO 2004/044998 describes a design for an organic light emitting diode (OLED). All of the layers, an outermost layer and the internal, light-emitting layers, have thicknesses chosen, according to their refractive index, to result in destructive interference of ambient light in reflection.

Finally, U.S. Pat. No 7,215,075 describes a structure that reduces reflections at the cathode of an OLED, which has a higher refractive index than its surrounding media. The method according to U.S. Pat. No. 7,215,075 is to replace the single cathode layer with an even number of layers, which have alternating high and low refractive indices.

SUMMARY OF THE INVENTION

A device and method in accordance with the present invention can be used in an optical system, such as a liquid crystal display, to minimize internal reflections. More particularly, the device and method in accordance with the present invention provide a structure that includes a first layer formed between a second and third layer, wherein a refractive index of the first layer is greater than a refractive index of the second and third layers. Further, a fourth layer is formed on one side of the second layer, and a fifth layer is formed on one side of the third layer, wherein the fourth and fifth layers have a lower refractive index than the second and third layers, respectively. The device and method in accordance with the present invention reduce internal reflections of an optical device while utilizing fewer layers relative to conventional optical devices. Additionally, a display device, such as an LCD, employing principles in accordance with the present invention is less costly to produce relative to conventional LCD devices.

According to one aspect of the invention, a structure for reducing internal reflections in an optical system includes a stack of layers including a first layer having a first refractive index, a second layer having a second refractive index, a third layer having a third refractive index, a fourth layer having a fourth refractive index, and a fifth layer having a fifth refractive index, wherein the second layer is arranged between the first layer and the third layer, and the fourth layer is arranged between the third layer and fifth layer, and wherein the third refractive index is numerically greater than the second and fourth refractive indexes, the second refractive index is numerically greater than the first refractive index, and the fourth refractive index is numerically greater than the fifth refractive index.

According to one aspect of the invention, the second refractive index is different from fourth refractive index.

According to one aspect of the invention, the first refractive index is different from the fifth refractive index.

According to one aspect of the invention, at least one layer comprises liquid crystal layer.

According to one aspect of the invention, the first layer comprises a color filter, the second layer comprises a polymide, the third layer comprises an indium-tin-oxide electrode, the fourth layer comprises a polymide and the fifth layer comprises a liquid crystal layer.

According to one aspect of the invention, the first layer comprises a liquid crystal material, the second layer comprises a polymide, the third layer comprises an indium-tin-oxide electrode, the fourth layer comprises a polymide and the fifth layer comprises a planarizing layer.

According to one aspect of the invention, the first layer comprises a planarizing layer, the second layer comprises a polymide, the third layer comprises a silicon nitride layer, the fourth layer comprises a polymide and the fifth layer comprises a silica layer layer.

According to one aspect of the invention, the respective layers are optimized to minimize total reflectivity by destructive interference.

According to one aspect of the invention, the structure further includes at least one of silica or silicon nitride arranged in the stack, and a light transmission path through the stack, wherein the at least one of silica or silicon nitride are arranged outside of the light transmission path.

According to one aspect of the invention, the second and/or fourth layers comprise at least one of polycarbonate, polystyrene, or indium zinc oxide.

According to one aspect of the invention, a display device includes a support, and the structure in accordance with the invention is arranged over the support.

According to one aspect of the invention, the support comprises glass.

According to one aspect of the invention, the display device is at least one of a liquid crystal display, an organic light emitting diode display, or an electrowetting display.

According to one aspect of the invention, a method for minimizing internal reflections in an optical device is provided, the optical device including a stack of layers, the stack comprising a first layer having a first refractive index, a second layer having a second refractive index, and a third layer having a third refractive index, the second layer formed between the first and third layer, wherein the second refractive index is numerically greater than the first refractive index and third refractive index, the method includes: forming a fourth layer having a fourth refractive index between the first and second layers, and forming a fifth layer having a fifth refractive index between the second and third layers, wherein the second refractive index is numerically greater than the fourth refractive index and the fifth refractive index, the fourth refractive index is numerically greater than the first refractive index, and the fifth refractive index is numerically greater than the third refractive index.

According to one aspect of the invention, the method includes selecting the fourth layer and fifth layer such that the fourth layer's refractive index is different from fifth layer's refractive index.

According to one aspect of the invention, the method includes optimizing the respective layers of the stack to minimize total reflectivity in the optical device by destructive interference.

According to one aspect of the invention, the method includes forming the second layer to a thickness such that an amplitude of total light reflected at the second layer depends on a phase difference between waves reflected from different surfaces of the second layer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The principles of the invention will now be described with reference to the drawings. Because the invention was conceived and developed for use in liquid crystal display systems, it will be herein described chiefly in this context. However, the principles of the invention in their broader aspects can be adapted to other types of optical systems, such as, for example, organic light emitting diode (LED) display systems and electrowetting display systems.

Figure 2:
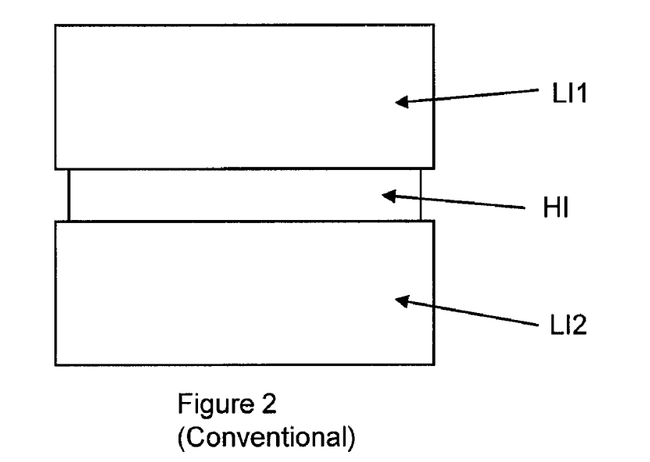
FIG. 2 illustrates an exemplary optical structure that includes a higher-refractive index layer between two lower-refractive index media.

Referring to FIG. 2, there is shown an exemplary optical structure to which principles in accordance with the present invention can be applied. As shown in FIG. 2, a higher-refractive index layer (e.g., media having a refractive index that is numerically greater than the refractive index of other media), HI, is surrounded by lower-refractive index layers (e.g., media having a refractive index that is numerically less than the refractive index of HI), LI1 and LI2, which may have the same or different refractive indices. The thickness of the higher-refractive index layer is such that the total reflected power is a result of interference between the two reflections at the surfaces of the higher-refractive index layer (there is a maximum thickness of the HI layer for which this is true, dependent on the coherence of the light).

Figure 3:
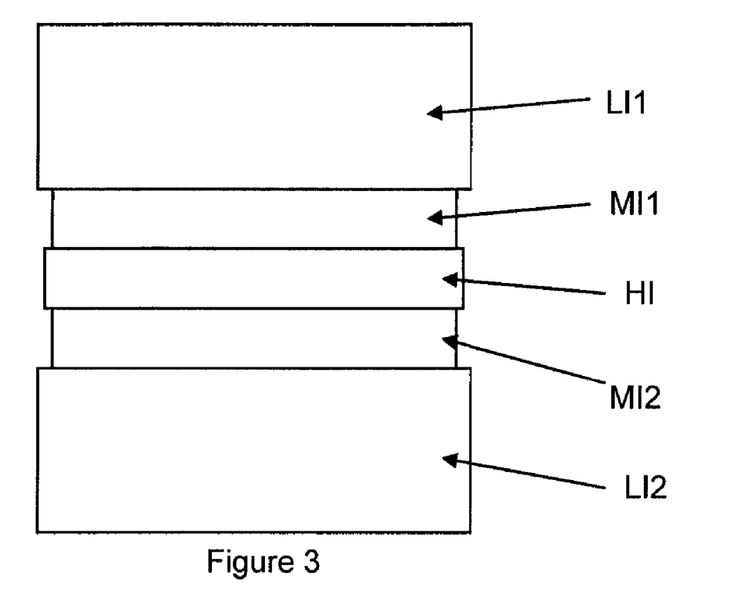
FIG. 3 illustrates an exemplary optical structure that includes intermediate-refractive index layers to reduce reflections in the optical system in accordance with an embodiment of the present invention.

Moving to FIG. 3, layers of intermediate refractive index, MI1 and MI2, are applied to each side of the higher-refractive index layer HI, in between the higher refractive index layer and the lower-refractive index surrounding media LI1 and LI2. MI1 and MI2 may have the same or different refractive indices.

The device in accordance with FIG. 3 reduces reflections at a higher-refractive index layer, surrounded by lower-refractive index media in an optical system. Further, the device in accordance with FIG. 3 reduces reflections more effectively than 2-, 4- and 6-layer systems, such as those described in U.S. Pat. No. 7,215,075. This will now be demonstrated below.

The following results have been obtained using a downhill simplex, numerical method of multidimensional minimization, as described in Press, W. H., et al., 'Numerical recipes in C: the art of scientific computing', second edition (Cambridge University Press, 1992), pages 408-412. The reflectivities are calculated for light at normal incidence, using a calculation as found in Smith, W. J., 'Modern Optical Engineering', third edition (McGraw-Hill, 2000), pages 205-207 (equation 7.32 has been corrected to agree with equations 7.30 and 7.31). They are averaged for a flat spectrum from 450 nm to 750 nm. Average reflectivity (hereafter referred to as 'reflectivity') is minimized with respect to refractive indices, where they are unknown, and thicknesses of the layers. The above-referenced portions of both Press and Smith are hereby incorporated by reference.

a) Referring to FIG. 2, consider the case of a layer, HI, with n=1.95, surrounded by media, LI1 and LI2, both with n=1.50. The minimum reflectivity at HI, with respect to its thickness, is then 0.013. HI is 148 nm thick in this case. The reflectivity is so low, despite the refractive index contrast between HI and LI1 and LI2, due to destructive interference of light reflected at the two surfaces of HI.

In accordance with the present invention, and as noted above, two extra layers of intermediate refractive index can be added to the system of FIG. 2. These are MI1 and MI2 as shown in FIG. 3. The reflectivity of the new, three-layer system (Hi, MI1 and MI2 form the three layers) can be minimized to 0.00005, i.e., reflectivity is reduced by a factor of 3000 relative to the device of FIG. 2. The refractive indices of MI1 and MI2 in this case are both 1.66 and their thicknesses are 85 nm. HI (with n=1.95) is 145 nm thick.

Figure 4:
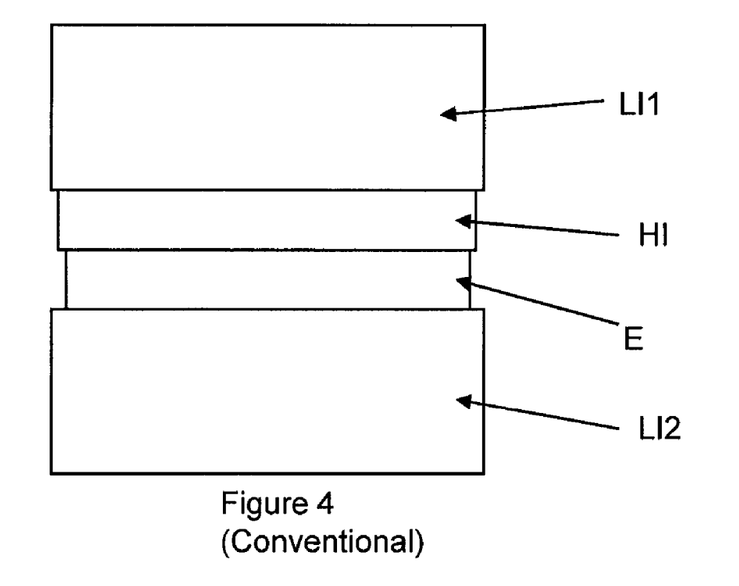
FIG. 4 illustrates a conventional two-layer optical system designed to reduce reflections relative to the one-layer system of FIG. 2.
Figure 5:
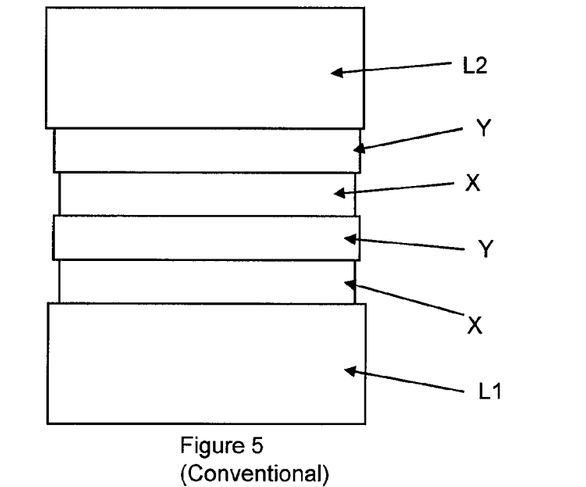
FIG. 5 illustrates a conventional four-layer optical system with alternating layers designed to reduce reflections relative to the one-layer system of FIG. 2.

In a method related to that of U.S. Pat. No. 7,215,075, a single extra layer, E, could instead be added to the system, as shown in the conventional optical structure of FIG. 4. In this two-layer case (HI and E form the two layers), the minimum possible reflectivity is 0.0084 and the extra layer has refractive index 1.61. Comparing the above results obtained with respect to the two layer system of FIG. 4 to the results for the device in FIG. 3, the reduction in reflectivity of a two-layer solution is improved by a factor of 170 in this case.

b) To make a comparison with the next simplest embodiment of U.S. Pat. No. 7,215,075, the materials used in the examples of U.S. Pat. No. 7,215,075 are examined. This is a four-layer system, with alternating higher and lower refractive indices, and is shown in FIG. 5 (layers Y, X, Y, and X form the four layers). L1 and L2 are the media surrounding the four layers. Each alternating layer is composed of either medium X or Y.

The examples in U.S. Pat. No. 7,215,075 use X and Y with refractive index 1.8 and 2.2. L1 and L2 are not specified, so this configuration cannot be compared fully with the embodiment shown in FIG. 3. L1 and L2 are here taken to be 1.50. Using the multi-dimensional minimization algorithm to vary the thicknesses in this four-layer structure, the reflectivity at these layers (surrounded by media L1 and L2) can be minimized to 0.018.

The same materials used in the above example can be used in the device in accordance with the present invention, e.g. in a three-layer system as described herein. The refractive index of HI is 2.2 in this case, those of MI1 and MI2 are both 1.8, and those of LI1 and LI2 are both 1.50. The reflectivity at the three layers can be minimized, with respect to thicknesses of the layers, to 0.0017.

Thus, using the same materials with the device in accordance with the present invention as opposed to the four-layer embodiment of U.S. Pat. No. 7,215,075, the reflectivity is reduced by an order of magnitude.

c) Referring to FIG. 5, a four-layer system is now considered having the refractive indices of L1 being 1.50, that of L2 being 1.60 and those of X and Y being 1.70 and 1.95, respectively. The four-layer system then has a minimum reflectivity of 0.0039.

The three-layer system in accordance with the present invention, using the same materials, i.e., refractive indices of 1.70, 1.95 and 1.70 for MI1, HI and MI2 in FIG. 3, allows a minimum reflectivity of 0.00056. The reflectivity is again reduced, this time by a factor of 7, compared with the use of the same materials according to the four-layer embodiment of U.S. Pat. No. 7,215,075.

A six-layer alternating system (also an embodiment of U.S. Pat. No. 7,215,075), using refractive indices 1.70 and 1.95 allows a minimum reflectivity of 0.0037.

Considering all of these results, it can be seen that when a higher-refractive index layer is surrounded by lower-refractive index media, the device in accordance with the present invention offers superior reduction of reflections when compared to solutions according to U.S. Pat. No. 7,215,075.

The device in accordance with the present invention will be described more fully hereinafter with reference to the accompanying drawings. The principles in accordance with the present invention, however, may be embodied in many different forms and should not be construed as limited to the embodiments set forth herein.

Embodiment One

Referring to FIG. 1, there is shown an example of an optical structure embodied as a liquid crystal display (LCD), where one ITO electrode, 102, with n≈1.95, lies between layers of liquid crystal (LC), 104, with n≈1.53, and glass or color filter (CF), 101, with n≈1.53, and the other lies between LC, 104 and a planarizing resin, 108, with n≈1.59. There is also a thin layer of polyimide (PI), 103, with n≈1.70, between the LC and each ITO electrode. There are also layers of silicon nitride, 105, with n≈2.04, between layers of silica, 106, with n≈1.55 and/or the planarizing resin. The silica and silicon nitride layers are used as dielectric and for passivation in and around the TFT system. Glass, 107, supports the structure. This is one typical structure in use in the industry, and is also described in Table 1, with thickness also given for each layer.

TABLE 1

| Material | Label in FIG. 1 | Refractive index (approximate) | Thickness |
|---|---|---|---|
| Color filter (CF) | 101 | 1.50 | >10 μm |
| ITO | 102 | 1.95 | 138 nm |
| Polyimide (PI) | 103 | 1.70 | 70 nm |
| LC | 104 | 1.53 | 3 μm |
| Polyimide (PI) | 103 | 1.70 | 76 nm |
| ITO | 102 | 1.95 | 138 nm |
| Planarizing resin | 108 | 1.59 | 2.5 μm |
| Silicon nitride | 105 | 2.04 | 330 nm |
| Silica | 106 | 1.55 | 700 nm |
| Silicon nitride | 105 | 2.04 | 300 nm |
| Silica | 106 | 1.55 | 380 nm |
| Glass | 107 | 1.53 | >10 μm |

The structure described in Table 1 has thicknesses of PI and ITO optimized to minimize total reflectivity by destructive interference. (These thicknesses are within the typical manufacturing range.) The total reflectivity of this structure is 0.104; 10.4% of incident light is reflected by this internal structure.

Figure 6:
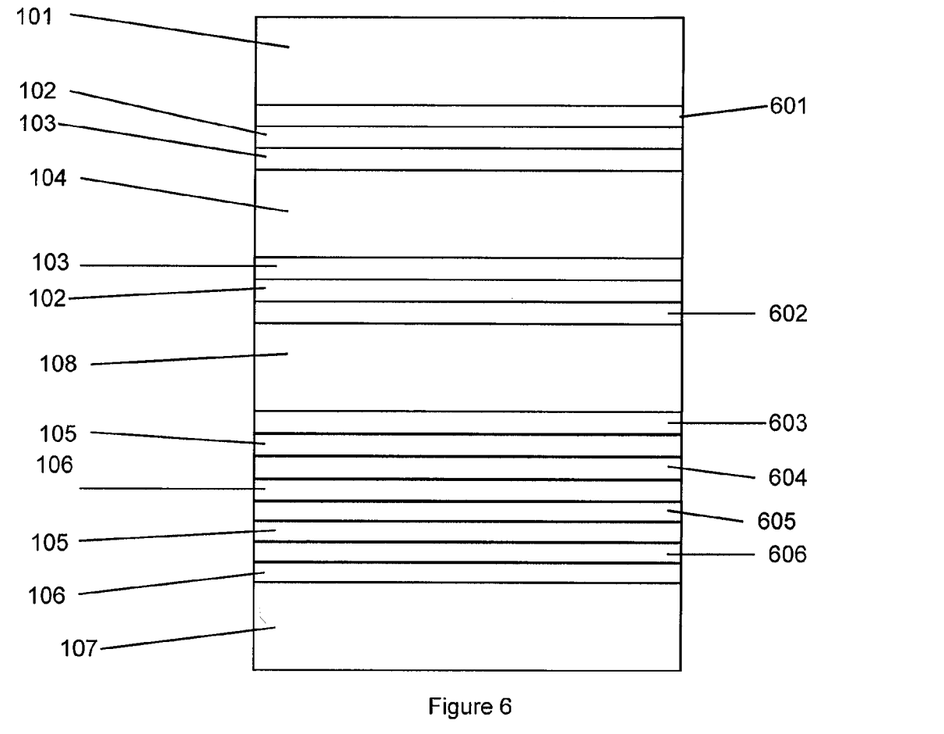
FIG. 6 illustrates an exemplary LCD structure that includes intermediate-refractive index layers in accordance with an embodiment of the present invention.

Referring now to FIG. 6, extra layers of intermediate refractive index, 601, 602, 603, 604, 605 and 606, can be placed between higher- and lower-refractive index layers. For example, 601 is inserted between the ITO and CF, forming the structure of FIG. 3 in accordance with the invention, together with the LC and PI. Table 2 describes the case where the layers 601, 602, 603, 604, 605 and 606 are polyimide, with n≈1.70.

The structure described in Table 2 has thicknesses of PI and ITO optimized to minimize total reflectivity by destructive interference. The total reflectivity of this structure is 0.0091; 0.91% of incident light is reflected by this internal structure. Therefore, using a device in accordance with the invention, wherein polyimide is used as the intermediate-refractive index material, has reduced the reflectivity of this LCD structure by a factor of 11.

TABLE 2

| Material | Refractive index (approximate) | Thickness |
|---|---|---|
| Color filter (CF) | 1.50 | >10 μm |
| Polyimide (PI) | 1.70 | 81 nm |
| ITO | 1.95 | 138 nm |
| Polyimide (PI) | 1.70 | 81 nm |
| LC | 1.53 | 3 μm |
| Polyimide (PI) | 1.70 | 80 nm |
| ITO | 1.95 | 138 nm |
| Polyimide (PI) | 1.70 | 82 nm |
| Planarizing resin | 1.59 | 2.5 μm |
| Polimide (PI) | 1.70 | 84 nm |
| Silicon nitride | 2.04 | 330 nm |
| Polyimide (PI) | 1.70 | 77 nm |
| Silica | 1.55 | 700 nm |
| Polyimide (PI) | 1.70 | 75 nm |
| Silicon nitride | 2.04 | 300 nm |
| Polyimide (PI) | 1.70 | 80 nm |
| Silica | 1.55 | 380 nm |
| Glass | 1.53 | >10 μm |

If the refractive index of layers 601, 602, 603, 604, 605 and 606 can be freely chosen, as well as their thickness, the structure of Table 3 results (the question marks in table 3 indicate that materials having appropriate refractive index can be freely chosen).

The structure described in Table 3 has refractive indices of layers 601, 602, 603, 604, 605 and 606 and thicknesses of PI, ITO and layers 601, 602, 603, 604, 605 and 606 optimized to minimize total reflectivity by destructive interference. The total reflectivity of this structure is 0.0050; 0.50% of incident light is reflected by this internal structure. Therefore, using a device in accordance with the invention, wherein polyimide is used as the intermediate-refractive index material, has reduced the reflectivity of this LCD structure by a factor of 21.

TABLE 3

| Material | Refractive index (approximate) | Thickness |
|---|---|---|
| Color filter (CF) | 1.50 | >10 μm |
| ? | 1.68 | 81 nm |
| ITO | 1.95 | 139 nm |
| Polyimide (PI) | 1.70 | 80 nm |
| LC | 1.53 | 3 μm |
| Polyimide (PI) | 1.70 | 81 nm |
| ITO | 1.95 | 142 nm |
| ? | 1.73 | 82 nm |
| Planarizing resin | 1.59 | 2.5 μm |
| ? | 1.77 | 81 nm |
| Silicon nitride | 2.04 | 330 nm |
| ? | 1.70 | 86 nm |
| Silica | 1.55 | 700 nm |
| ? | 1.79 | 70 nm |
| Silicon nitride | 2.04 | 300 nm |
| ? | 1.76 | 75 nm |
| Silica | 1.55 | 380 nm |
| Glass | 1.53 | >10 μm |

Embodiment 2

It is also possible to remove the silica and/or silicon nitride from the areas through which light is transmitted in an LCD. This is because they are only required around the TFT and circuitry in the device. Light is not transmitted through these regions (it is either reflected by metal or absorbed in the commonly used black mask), and so they can be considered irrelevant for purposes of reducing internal reflections. The silica and silicon nitride can in principle be patterned so that they are only found in these opaque regions, not in the transparent part of the pixel. In this case, the structure is as given in Table 4 and FIG. 7.

The structure described in Table 3 has the thicknesses of PI and ITO optimized to minimize total reflectivity by destructive interference. The total reflectivity of this structure is 0.015; 1.5% of incident light is reflected by this internal structure.

TABLE 4

Figure 7:
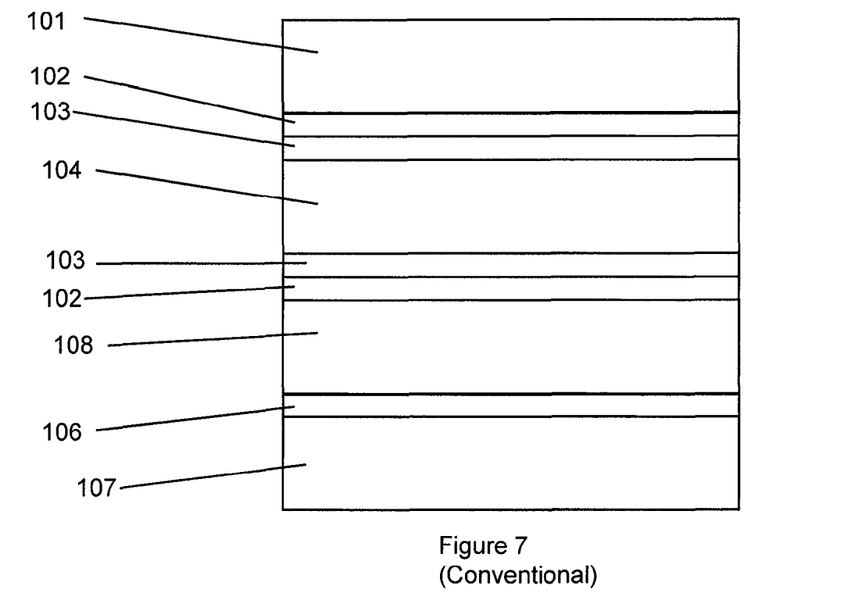
FIG. 7 illustrates an alternative LCD structure to the structure of FIG. 1

| Material | Label in FIG. 7 | Refractive index (approximate) | Thickness |
|---|---|---|---|
| Color filter (CF) | 101 | 1.50 | >10 μm |
| ITO | 102 | 1.95 | 134 nm |
| Polyimide (PI) | 103 | 1.70 | 49 nm |
| LC | 104 | 1.53 | 3 μm |
| Polyimide (PI) | 103 | 1.70 | 60 nm |
| ITO | 102 | 1.95 | 134 nm |
| Planarizing resin | 108 | 1.59 | 2.5 μm |
| Silica | 106 | 1.55 | 380 nm |
| Glass | 107 | 1.53 | >10 μm |

Figure 8:
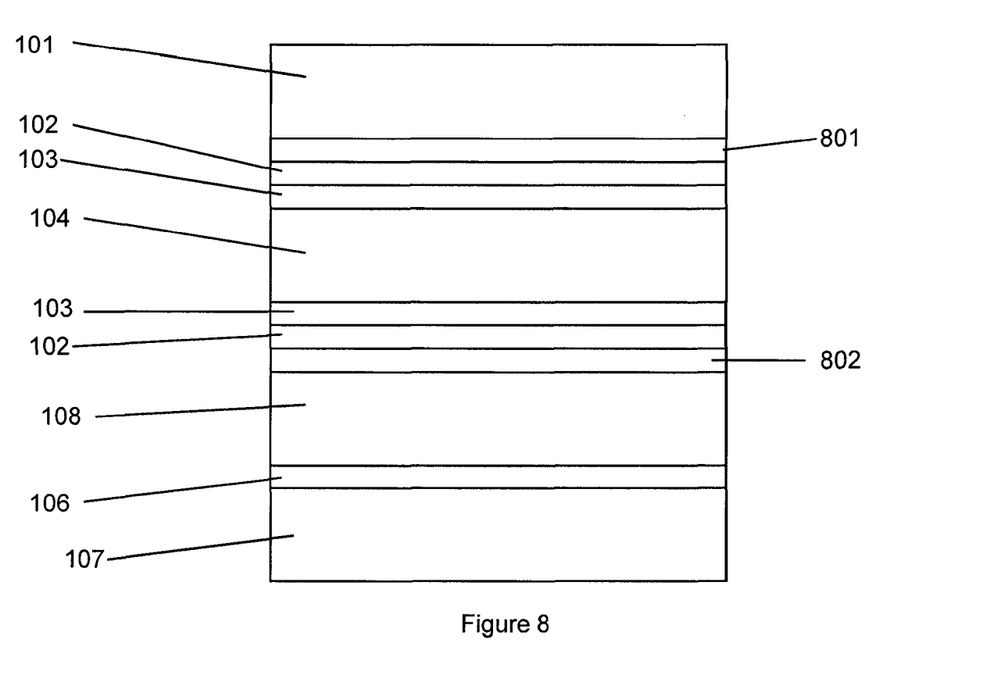
FIG. 8 illustrates the LCD structure of FIG. 7 with intermediate-refractive index layers in accordance with an embodiment of the present invention.

Referring to FIG. 8, extra layers of intermediate refractive index, 801 and 802 can be placed between higher- and lower-refractive index layers of the system of FIG. 7. For example, 801 can be inserted between the ITO and CF, forming the structure of FIG. 3 in accordance with the present invention, together with the LC and PI. Table 5 describes the case where 801 and 802 are polyimide layers, with n≈1.70.

TABLE 5

| Material | Refractive index (approximate) | Thickness |
|---|---|---|
| Color filter (CF) | 1.50 | >10 μm |
| Polyimide (PI) | 1.70 | 74 nm |
| ITO | 1.95 | 122 nm |
| Polyimide (PI) | 1.70 | 74 nm |
| LC | 1.53 | 3 μm |
| Polyimide (PI) | 1.70 | 81 nm |
| ITO | 1.95 | 142 nm |
| Polyimide (PI) | 1.70 | 83 nm |
| Planarizing resin | 1.59 | 2.5 μm |
| Silica | 1.55 | 380 nm |
| Glass | 1.53 | >10 μm |

The structure described in Table 5 has thicknesses of PI and ITO optimized to minimize total reflectivity by destructive interference. The total reflectivity of this structure is 0.00080; 0.50% of incident light is reflected by this internal structure. Therefore, using the device in accordance with the invention, wherein polyimide is used as the intermediate-refractive index material, has reduced the reflectivity of this LCD structure by a factor of 19.

Other Intermediate-Refractive Index Materials AND Embodiments

For such use in an LCD, or other system, other materials, organic and inorganic may be found which have an appropriate refractive index. Polycarbonate (n≈1.59), polystyrene (n≈1.59) are two examples of polymers which may be used between some layers. Indium zinc oxide can be deposited with a refractive index of 1.8 (according to U.S. Pat. No. 7,215,075). Additionally, the structure in accordance with the present invention can be utilized in liquid crystal display systems, as well as organic light emitting diode (OLED) display systems and electrowetting display systems.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A structure for reducing internal reflections in an optical system, comprising a stack of layers including a first layer having a first refractive index, a second layer having a second refractive index, a third layer having a third refractive index, a fourth layer having a fourth refractive index, and a fifth layer having a fifth refractive index,
   wherein the second layer is arranged between the first layer and the third layer, and the fourth layer is arranged between the third layer and fifth layer, and
   wherein the third refractive index is numerically greater than both the second and fourth refractive indexes, the second refractive index is numerically greater than the first refractive index, and the fourth refractive index is numerically greater than the fifth refractive index, wherein the first layer comprises a color filter, the second layer comprises a polyimide, the third layer comprises an indium-tin-oxide electrode, the fourth layer comprises a polyimide and the fifth layer comprises a liquid crystal layer.

2. The structure according to claim 1, wherein the second refractive index is different from fourth refractive index.

3. The structure according to claim 2, wherein the first refractive index is different from the fifth refractive index.

4. The structure according to claim 1, further comprising:
   at least one layer of silica or silicon nitride arranged in the stack; and
   a light transmission path through the stack, wherein the at least one of silica or silicon nitride are arranged outside of the light transmission path.

5. The structure according to claim 1, wherein the second and/or fourth layers comprise at least one of polycarbonate, polystyrene, or indium zinc oxide.

6. The structure according to according to claim 1, wherein the respective layers of the stack are optimized to minimize total reflectivity in the optical system by destructive interference.

7. A display device, comprising a support, and the structure according to claim 1 arranged on or over said support.

8. The display device according to claim 7, wherein the support comprises glass.

9. The display device according to claim 7, further comprising:
   at least one layer of silica or silicon nitride arranged in the stack; and
   a light transmission path through the stack, wherein the at least one of silica or silicon nitride are arranged outside of the light transmission path.

10. The display device according to claim 7, wherein the device is at least one of a liquid crystal display, an organic light emitting diode display, or an electrowetting display.

11. A structure for reducing internal reflections in an optical system, comprising a stack of layers including a first layer having a first refractive index, a second layer having a second refractive index, a third layer having a third refractive index, a fourth layer having a fourth refractive index, and a fifth layer having a fifth refractive index,
    wherein the second layer is arranged between the first layer and the third layer, and the fourth layer is arranged between the third layer and fifth layer, and
    wherein the third refractive index is numerically greater than both the second and fourth refractive indexes, the second refractive index is numerically greater than the first refractive index, and the fourth refractive index is numerically greater than the fifth refractive index, wherein the first layer comprises a liquid crystal material, the second layer comprises a polyimide, the third layer comprises an indium-tin-oxide electrode, the fourth layer comprises a polyimide and the fifth layer comprises a planarizing layer.

12. A display device, comprising a support, and a structure according to claim 11 arranged on or over said support.

13. A structure for reducing internal reflections in an optical system, comprising a stack of layers including a first layer having a first refractive index, a second layer having a second refractive index, a third layer having a third refractive index, a fourth layer having a fourth refractive index, and a fifth layer having a fifth refractive index,
    wherein the second layer is arranged between the first layer and the third layer, and the fourth layer is arranged between the third layer and fifth layer, and
    wherein the third refractive index is numerically greater than both the second and fourth refractive indexes, the second refractive index is numerically greater than the first refractive index, and the fourth refractive index is numerically greater than the fifth refractive index, wherein the first layer comprises a planarizing layer, the second layer comprises a polyimide, the third layer comprises a silicon nitride layer, the fourth layer comprises a polyimide and the fifth layer comprises a silica layer.

14. A display device, comprising a support, and a structure according to claim 13 arranged on or over said support.

* * * * *